(12) United States Patent
Palacios Prieto

(10) Patent No.: US 9,534,582 B2
(45) Date of Patent: Jan. 3, 2017

(54) WIND ENGINE

(76) Inventor: Angel Palacios Prieto, Madrid (ES)

( * ) Notice: Subject to any disclaimer, the term of this patent is extended or adjusted under 35 U.S.C. 154(b) by 600 days.

(21) Appl. No.: 14/123,298

(22) PCT Filed: Jun. 1, 2012

(86) PCT No.: PCT/ES2012/070412
§ 371 (c)(1),
(2), (4) Date: Dec. 2, 2013

(87) PCT Pub. No.: WO2012/164140
PCT Pub. Date: Dec. 6, 2012

(65) Prior Publication Data
US 2014/0099186 A1    Apr. 10, 2014

(30) Foreign Application Priority Data

Jun. 3, 2011  (ES) .................................. 201130920

(51) Int. Cl.
*F03D 3/04*  (2006.01)
*F03D 3/02*  (2006.01)

(52) U.S. Cl.
CPC ............... *F03D 3/0472* (2013.01); *F03D 3/02* (2013.01); *F03D 13/20* (2016.05); *F03D 15/00* (2016.05); *Y02E 10/728* (2013.01); *Y02E 10/74* (2013.01)

(58) Field of Classification Search
CPC .......... F03D 3/02; F03D 3/0472; F03D 13/20; F03D 15/00; Y02E 10/728; Y02E 10/74
See application file for complete search history.

(56) References Cited

U.S. PATENT DOCUMENTS

| 4,156,580 | A  | * | 5/1979 | Pohl | ........................ F03D 3/02 290/55 |
| 4,926,061 | A  |   | 5/1990 | Arreola, Jr. | |
| 7,144,214 | B2 | * | 12/2006 | Kinpara | .................. F03D 3/005 415/142 |
| 7,777,363 | B2 | * | 8/2010 | Wang | ..................... F03D 3/067 290/44 |
| 2010/0019251 | A1 | | 1/2010 | Lee et al. | |

FOREIGN PATENT DOCUMENTS

| EP | 0050891 A1 | 5/1982 |
| EP | 0064440 A2 | 11/1982 |
| ES | 150837 | 10/1940 |
| ES | 2598890 | 2/1982 |
| ES | 2049568 A1 | 4/1994 |
| ES | 1028882 U | 3/1995 |
| ES | 2109173 A1 | 1/1998 |

(Continued)

*Primary Examiner* — Igor Kershteyn
(74) *Attorney, Agent, or Firm* — Richard M. Goldberg

(57) ABSTRACT

A wind motor includes a post (1) tower or other supporting structure, a bottom base (2) that supports at least one pair of shafts (4, 5), at least one rotor (6) on each of the shafts (4, 5), a mechanism for synchronizing the rotation of the rotors (6), a front shield (7) secured to the bottom base (2), an arrangement for the free rotation of the bottom base (2) with respect to the post (1), tower or supporting structure, at least one electric generator or another device for converting mechanical energy, driven by one of the rotor shafts (4, 5) or by the synchronizing mechanism, and an inertial body driven by the energy provided by the rotors.

9 Claims, 4 Drawing Sheets

(56) References Cited

FOREIGN PATENT DOCUMENTS

| ES | 1047473 U | 4/2001 |
|----|-----------|--------|
| ES | 1049311 U | 12/2001 |
| ES | 1053772 U | 5/2003 |
| FR | 2300235 | 9/1976 |
| GB | 2007775 A | 5/1979 |
| WO | 2008/062093 A1 | 5/2008 |

* cited by examiner

WIND ENGINE

BACKGROUND OF THE INVENTION

The present invention relates to an electrical or mechanical power generator, consisting of one or more assemblies of synchronized windmills driven by wind force.

Increasing energy needs require the research for new sources and to optimize the existing ones. Wind has a certain number of advantages, such as its huge power with no cost involved, given that it is provided by nature itself.

STATE OF THE ART

Since the old windmills, several wind generators or wind motors of different kinds have been described. The most common type is the one that we can find in most of our landscapes, composed of a generator driven by a set of blades whose axis is coaxial with wind direction.

An example of such generators can be seen in ES 1047473 U.

Another type of generator is that composed of a number of incidence surfaces, rotating around a vertical axis that is perpendicular to wind direction.

ES 1 028 882 U or ES 1 049 311 describe generators of such type. ES 150837 describes a generator with one or multiple heights in which each height is provided with a blade generator of the type described in ES 1 049 311. A similar solution can be found in ES 2 109 173, in which a group of driving elements are arranged along a single axis.

WO 2008/062093 A1 describes a domestic wind generator in which a set of blades are arranged at different heights forming a spiral, provided with a housing that guides wind incidence for its optimization.

US 2010/019251 also describes a generator with an axis perpendicular to wind direction, in which sets of blades are arranged at different heights on a single shaft, where each set is arranged with an angle offset relative to the set of blades in the other heights.

Other types of wind generators or wind motors are those that comprise motor bodies provided with different geometrical shafts, in which such geometrical shafts are synchronized by a shared mechanism. An example of such generators with synchronized bodies can be seen in EP 0 050891 A1, although in this case, the axis of the generators is coaxial to wind direction.

ES 1 053 772 U describes a generator consisting of different bodies on a vertical axis with one or more blade sets in each of them, which are synchronized through a coupling mechanism. ES 2 049 568 describes a generator composed of an assembly of three vertical bodies that are synchronized through a gear mechanism.

ES 259880 describes a wind energy collector that comprises a body with an air inlet and an air outlet, arranged over a freely-rotating vertical shaft, with a guiding device provided with wind vanes secured to the structure and equipped with gears or pulleys that transfer motion to a receptor of such energy.

EP 0 064 440 describes a vertical-axis wind generator with a double rotor and a guided flow, that comprises a synchronized pair of vertical axis rotors, partially surrounded by an outer housing that conducts air along its outside to move the rotors.

SUMMARY OF THE INVENTION

The proposed invention consists of a wind motor with multiple, synchronized rotors, which simplifies the solutions provided by the previous models at a reduced cost and with easy maintenance.

In particular, it is described as a wind motor that comprises:

A post, tower or any other supporting structure;

A power head equipped with two or more rotors in at least two spaced vertical shafts; such head comprises a link to the supporting structure in its front end and can rotate freely around such supporting structure; the position of the centre of mass and the aerodynamics of the head ensures that such head remains always facing the wind. Such power head, comprises in turn the following items at least:

A bottom body;

A top body;

A front shield, essentially V shaped; and

A mechanical device that synchronizes the rotor assembly;

A mechanical output device, driven by one of the shafts of the rotors or through a mechanical synchronizing device;

this mechanical output can turn an electrical generator or any other mechanical system;

The bottom body and the top body form the supporting structure for the rotors and for the "V" shaped front shield; the joining and fixing of the bottom and top bodies can be accomplished with the aforementioned "V" shaped shield, and with the shafts of the rotors, or by external brackets.

The wind motor of this invention also comprises an inertial body. The inertial body could be part of the synchronizing mechanism or be coupled to it through a clutch device.

BRIEF DESCRIPTION OF THE FIGURES

In order to illustrate the explanation that will follow, four pages of drawings are attached to this report, containing five figures which show the essential operation of the present invention, as follows.

DETAILED DESCRIPTION OF THE EMBODIMENTS OF THE INVENTION

Figure 1:
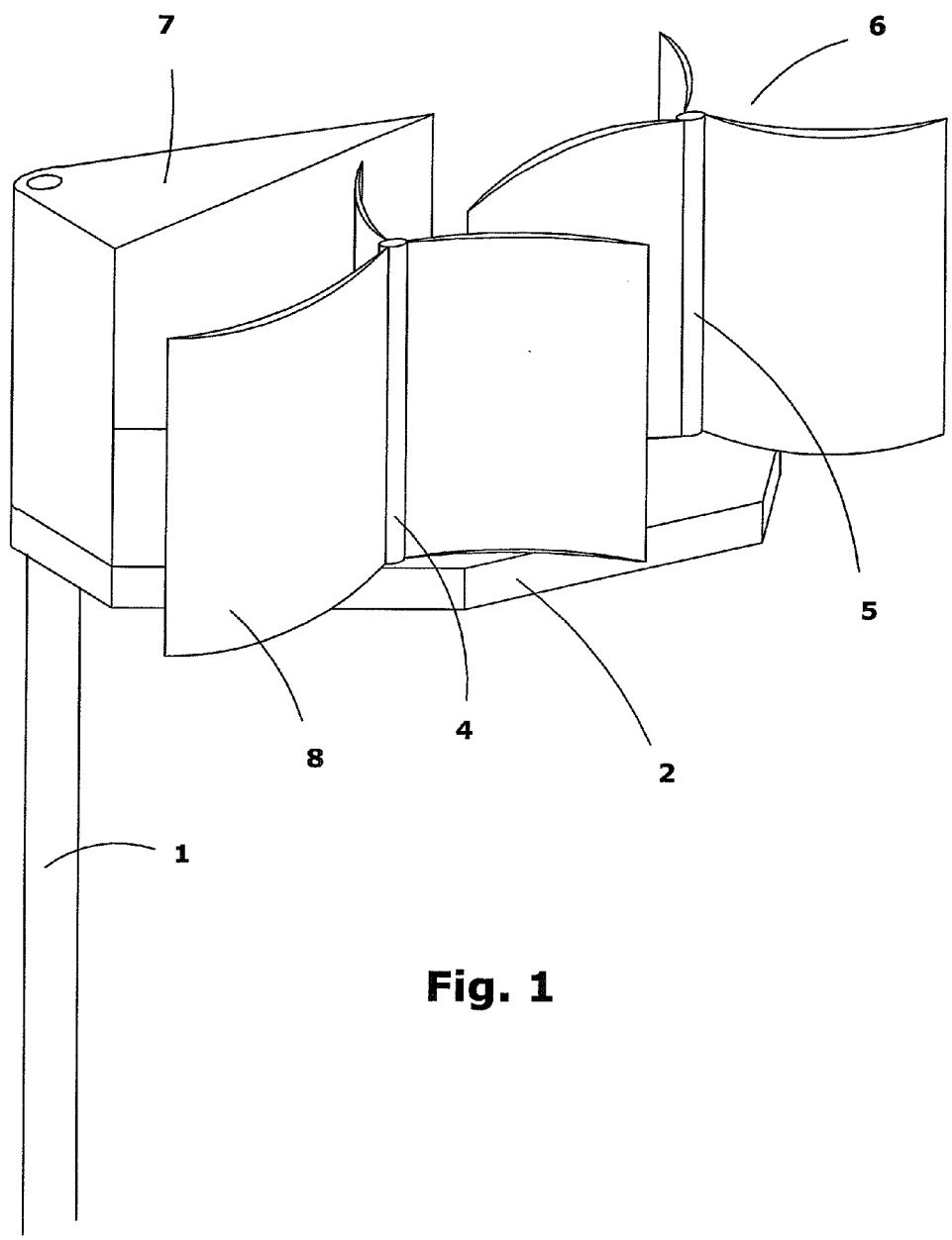
FIG. 1 shows the schematic perspective view of the first sample arrangement of the wind motor of the invention, equipped with two synchronized rotors, arranged over a supporting base or platform provided with the synchronizing mechanism.
Figure 2:
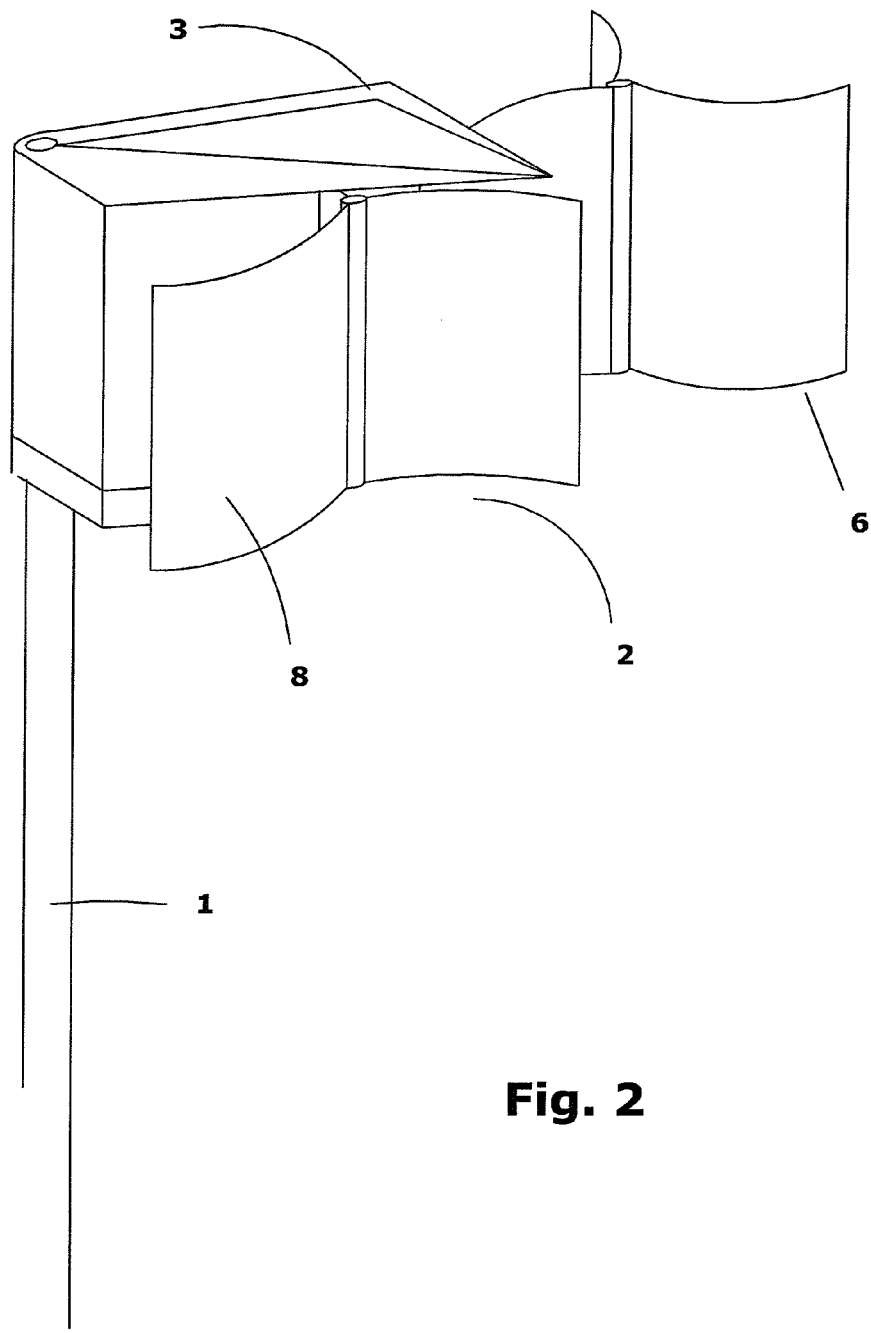
FIG. 2 shows a schematic perspective view, similar to the one in FIG. 1, but in which the rotors have been covered with a top base provided with a wind vane.
Figure 3:
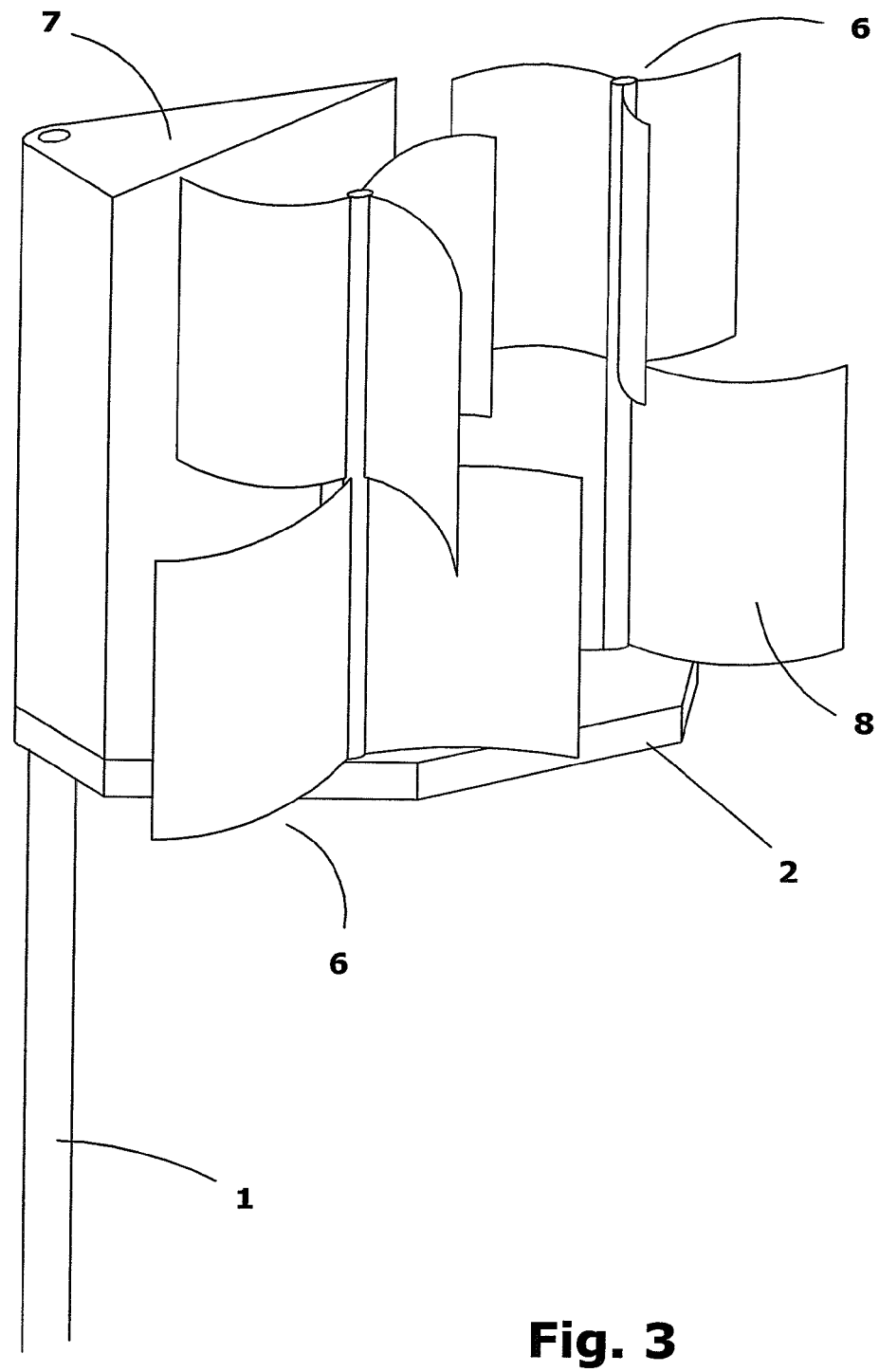
FIG. 3 shows a view, similar to the one in FIG. 1, but in which the rotors include sets of blades at different heights and in complementary positions.

The wind motor described, is installed over a post (1), tower or other support, that comprises a bottom base (2) that supports at least a couple of shafts, (4, 5) for at least one pair of rotors (6) with blades (8) on a vertical axis. Normally it will also have a top base (3) that will be used as a support for the shafts (4, 5) of the rotors (6). The shafts (4, 5) of the rotors (6) are coupled to their respective mechanisms which are synchronized. The bottom base (2) will be arranged in such a way that it can freely rotate over the post (1). The top base (3) comprises at least one guiding item used as a wind vane.

According to a preferred embodiment, the number of blades in each set in each rotor, is three.

A front shield is also provided (7). The rotors receive the wind on the outer blades (8), not protected by this front shield (7); the front shield (7) is essentially V or wedge shaped, exerting minimum resistance to the wind. The blades (8) of the rotor (6) located at the inner part (in an area located between the rotor shafts), are offset in the opposite direction to the wind, and they do not receive the incidence of the wind due to the action of the front shield (7).

Preferably, each shaft (4, 5) comprises more than one set of blades (8) located at different heights and offset at a certain angle from the ones in the height below. This aids a greater consistency in the thrust force received by the blade set in both sides and over time. When a set of blades is receiving the action of the wind over one of its blades, the force received depends on the angle of incidence of the wind on the blade. A 90° angle provides the maximum action. However, when there is a forward movement, the projection of the area of the blade exposed to the wind is smaller, and it is reduced to a certain extent by the next blade that starts to show up (in the reverse part of the path, they are hidden and protected by the front shield (7)). Furthermore, given that the blades (8) of each pair of rotors (6) are arranged alternatively, in such a way, that they return alternatively in their return path (in which they travel the same distance), when the wind incidence on one blade is maximum, it is minimum on the blade of the other rotor. It is, therefore, convenient that the reverse situation takes place at a different height, so one of the rotors (6) of one of the heights has the maximum wind incidence while the other has the minimum incidence. This arrangement, synchronized with the rotors (6) of the other shaft, balances the two shafts, avoiding unnecessary stresses.

As we have stated, there is a synchronizing mechanism between the shafts. According to one option, the synchronizing mechanism consists of a pair of crown wheels (9) connected to each other. Nevertheless, the connection and synchronization can be accomplished through an intermediate mechanism, by direct intermesh, or by drive chains or belts.

The use of the energy of the motion is made through an electrical generator or other device for converting the mechanical energy, which can be connected to at least one of the rotor shafts (4), or to an external shaft coupled to at least one of those shafts (4).

The mechanical assembly comprises an inertial body moved directly or indirectly by the shafts (4) of the rotors (6), normally with one or more flywheels. Preferably, the inertial body is disengaged from the synchronizing mechanism by at least one clutch device. Preferably the clutch is automatic, so when the speed of the rotors moved by the effect of the wind is higher than the speed of the inertial body, the clutch device will engage both mechanisms, and disengage them when the speed of the rotors is lower.

The structure composed of the top and the bottom base, as well as the front shield (7), also comprises side spoilers (10) that allow the wind to be properly conducted for a better use of its energy. Furthermore, those spoilers have an additional function as a wind vane, to adequately position the power head facing the wind.

The front shield (7) can be opened/closed to a certain angle, in order to allow a higher or lower incidence of the wind over the blades (8) of the rotors (6).

Figure 4:
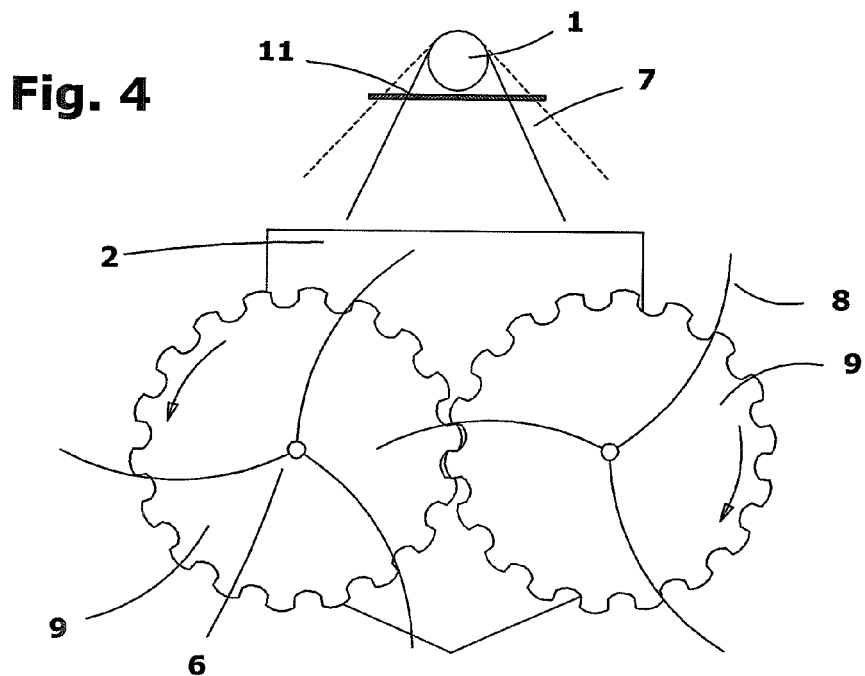
FIG. 4 shows a schematic top view of the rotor assembly of FIG. 1, as well as a partial shield for protection against the wind on the central area of the rotor set.
Figure 5:
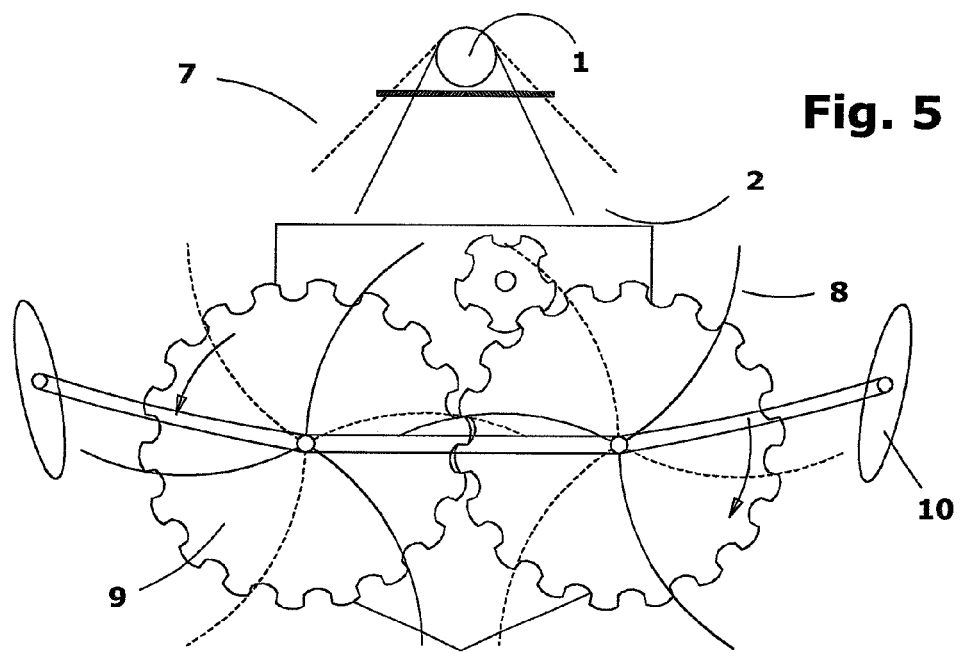
FIG. 5 shows a schematic view, similar to the one in FIG. 4, but in such, the rotors shown have complementary blades at different heights, where the first height is represented by a solid line.

According to the first option, it is opened using a worm gear (11) driven by an electric motor that separates the two side bodies that form that shield, determining the degree of the opening according to wind speed, and consequently, according to the rotational speed of the rotor, detected by the relevant sensor. Nevertheless, there are also other possible methods, for example, using cables driven by pulleys exerting a pulling force that is synchronized with the rotational speed of the rotor. If cables are used, they can also be driven by an electric motor. The opening is represented in FIG. 4, in which the dashed line shows a higher opening degree (lower exposure to the wind and higher protection of the blades), and the solid line shows a smaller opening (higher exposure to the wind and lower protection of the blades).

What is claimed is:

1. Wind motor, comprising:
   a supporting structure;
   a bottom base;
   at least one pair of shafts supported on the bottom base;
   at least one rotor on each of the shafts;
   a synchronizing mechanism for rotation of the rotors;
   a front shield secured to the bottom base;
   an arrangement for providing for free rotation of the bottom base with respect to the supporting structure;
   at least one mechanical-energy converting device, driven by one of:
      one said rotor shaft, and
      the synchronizing mechanism;
   an inertial body driven by energy provided by the at least one rotor,
   a clutch device that disengages the inertial body from at least one of:
      the synchronizing mechanism and
      the at least one rotor shaft, and
   the front shield comprises an opening/closing mechanism based on at least one of:
      wind force and
      rotational speed of the at least one rotor.

2. Wind motor, according to claim 1, further comprising a top base that holds the shafts of the rotors and the front shield.

3. Wind motor, according to claim 2, wherein the top base comprises at least one guiding device performing as a wind vane.

4. Wind motor, according to claim 1, wherein the front shield is one of triangular and wedge shaped.

5. Wind motor, according to claim 1, wherein at least one said rotor has more than one set of blades, arranged at different heights, with an angular offset relative to the blades at different heights.

6. Wind motor, according to claim 1, wherein the synchronizing mechanism synchronizes rotation of the rotors and is comprised of crown wheels on respective shafts, with the crown wheels connected to each other.

7. Wind motor, according to claim 1, further comprising adjustable side spoilers.

8. Wind motor, according to claim 1, wherein the front shield opening/closing mechanism includes a worm gear driven by an electric motor.

9. Wind motor, according to claim 1, wherein the front shield opening/closing mechanism includes a set of tensile cables driven by pulleys exerting a pulling force that is synchronized with the rotational speed of the at least one rotor.

* * * * *